April 2, 1929.   J. E. THORNTON   1,707,825
MULTICOLOR CINEMATOGRAPH AND OTHER FILM
Filed May 10, 1924
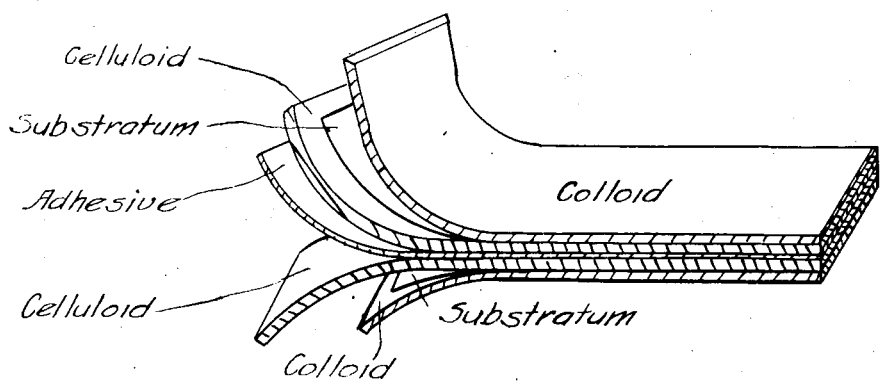
INVENTOR.
John E. Thornton Patented Apr. 2, 1929.

1,707,825

UNITED STATES PATENT OFFICE.

JOHN EDWARD THORNTON, OF LONDON, ENGLAND.

MULTICOLOR CINEMATOGRAPH AND OTHER FILM.

Application filed May 10, 1924, Serial No. 712,462, and in Great Britain May 18, 1923.

This invention relates to the production of transparent multi-color cinematograph or other film-positives in four or three colors or tones of color.

In my application Serial No. 711,251, I have described a multi-color cinematograph or other film-positive built up from four component images, each representing a section of a four-image picture comprising either four or three colors as desired, two of the component images being formed upon one thin film and the other two upon another thin film, the two films preferably being obtained by longitudinally severing a double-width film upon which two pairs of images have been formed side-by-side.

According to this invention the film is produced in similar manner from two thin film strips each having two superimposed component images on one side, the thin strips however being cemented together back-to-back celluloid-to-celluloid so as to have two images on one side and two images on the other side of a central transparent support.

The invention can also be applied to the production of non-cinematograph films for numerous applications, such as lantern-slides, advertising purposes, window transparencies, and the like, which are printed of much larger sizes and varied shapes, and which do not require cinematograph perforations for traction purposes.

The type of film produced is that technically known as the "subtractive", in which each picture, with its entire range of colors, is complete in the film itself, and the film is of no greater length than an ordinary black and white or monochrome film, and fits all standard projectors.

The drawing shows a perspective view of the film.

The range of colors or shades obtainable from this four-color film is however in reality more than four only. By one combination one of the prints may comprise crimson and yellow, and the other print blue and green. The complementary color of one film will therefore be found in the other film. But this combination may be reversed, so that the complementary of each color will be found in the same film, and in that case one print may comprise crimson and blue-green, and the other print yellow and blue (or violet). When the two films are superimposed the pictures thereon will, when viewed as transparencies, apparently each contain the following colors:—crimson, yellow, blue and green by direct colors, and orange, blue-green, purple, brown, black and other shades indirectly by combination or overlap of two or more colors; so that in effect there will be a larger number of colors or shades than the original four, thus further lengthening the color-scale far beyond the range obtainable from a film of the "two-color" type.

A three-color type of picture-film can also be obtained, such as usually consists of red, blue, and yellow. This result is attained by printing one of the colors such as red upon one film, the second color such as blue upon the other film, and the third color such as yellow by printing in duplicate upon both films. But this combination can be varied as desired. For example, two different shades or intensities of one color may be used, and a combination such as deep crimson, orange-red, blue and yellow; or dark blue such as violet, light blue, red and yellow may be adopted. Or one film may contain two colors and the other only one color if preferred.

*Construction of the film in the present invention.*

The object of the present invention is to produce a similar four-color or three-color cinematograph or other film but with a central celluloid support, and with its section-images divided so that two are upon one face and two upon the other face of the central strip.

And the object in constructing it in two parts, from two thin films, is to enable such a multi-color film to be easily, reliably and cheaply produced, by reducing the difficulties of production to the degree of making only two section-prints upon each film, instead of attempting to produce four prints upon one piece of film-stock, which, by the printing processes used in this and other color films, is a practical impossibility, and this is particularly so when using those printing processes that require exposure through the back (or celluloid side) of the film material and development from the front (or colloid side).

The above is a broad outline of the invention and I will now give a more detailed description of the several steps required to carry it into effect.

The first step is to produce suitable original (or camera) negatives by which the several different color sensations are analyzed.

*Primary (or camera) negatives.*

It will be obvious that the original (or camera) section-negatives must have their color values correctly balanced by the use of correct color filters when photographing to produce the negatives.

Any set of the original (camera) images may be reversed in relation to another in known manner by the use of prisms when photographing, in order that prints will correctly face when brought together.

These original (camera) section-negatives may be obtained by any of the various known arrangements of camera and optical systems, but the several section-images of the same picture must be made from exactly the same standpoint, through one lens, the primary image being split by prisms or other devices, each light-beam being then filtered through separate color filters before reaching the panchromatic sensitive negative film, all as is well known and understood. The original negatives may be formed for four-color in a four-way group upon one double-width film; in two groups upon two double-width films; or in successive order upon one single-width film; or upon four separate single-width films or on one four-width film; or in any other suitable way. For three-color the negatives may be formed side-by-side upon one triple-width film; or in successive order upon one single-width film; or upon three separate single-width films. The negatives may be placed in "staggered" order upon the film, or with gaps between each successive picture, for either the four or three-color class of negatives. Or the negatives may be made on screen-film which simultaneously records all colors at one exposure in the area of one picture, upon a single width strip of film.

*The secondary negatives or printing clichés.*

The term negatives is also hereinbefore used in the sense that it indicates the cliché-strip or strips used for printing from, although in some of the printing processes described a negative-image printing-cliché is required, and for other processes a positive-image printing-cliché is required.

Also some of the printing processes described require printing to be done from the back through the transparent celluloid base, and other processes require printing to be done from the front. Therefore the printing-clichés must be prepared to suit the particular printing processes adopted.

Also in reproducing from the primary negatives secondary images to form the printing-clichés, care must be taken to make one group or set of primary clichés face one way and the other set the reverse way, so that prints made therefrom will correctly assemble face to face.

Any primary negatives or secondary printing-clichés that are not correctly arranged at the start can be reconstructed by reproduction through camera and reversing prisms in any well-known manner.

*Film material.*

*Negatives*—Film material of the usual thickness is used, comprising a celluloid or similar base having a layer of sensitized colloid superimposed thereon, the two making a total thickness of about .005 or .006 of an inch. The sensitized layer is of the ordinary rapid gelatino-silver-bromide type to make the ordinary type of negatives required for some of the printing processes; but for negatives of the mosaic screen-filter type the celluloid base is prepared with such a screen below the sensitized layer as described in some of the other divisions of the invention.

*Positives.*—The film material comprises a base or support of celluloid, cellulose-acetate, or other suitable transparent material, but of only approximately one half standard positive-film thickness, or about .002 of an inch. To this is indissolubly attached a layer of colloid, which may be non-sensitized when photo-mechanical and dye-printing processes are to be used; or sensitized when gelatino-silver, bichromated gelatine, iron, uranium, or other sensitive processes are to be used; if the process is of the screen-filter type, the base is prepared with a mosaic filter screen before sensitizing; and if the process is of the colored sensitized grain type it is suitably prepared with such grains; all of these methods are described in the several divisions of the invention which deal with each of such processes.

*Reinforced positive-film-material.*—If the positive film is too thin and frail for easy handling it may be strengthened and increased in thickness by a reinforcing strip of paper, which is attached to the sensitized face or celluloid back of the film (according to the particular type of film and sensitizing process used) during its manufacture; and such reinforcing strip is removed from the printed film, when its temporary purpose has been fulfilled, at any suitable stage afterwards; all these matters are dealt with in the other divisions referred to.

Perforations, registration, and identification marks.

Accurate registration of the several pictures upon each strip, and of the component sections of the same picture, both in the negative and positive films, is secured by using perfectly accurate machines for making the perforations, and by making all corresponding holes in the several sections of film at the same time, by the same punch, whilst the two films are laid and clamped face-to-face or back-to-back, in order that both shall be punched exactly alike.

To ensure the corresponding sections of negative or positive films being easily identified they may be printed with a series of numbers or other marks of identification.

Shrinkage, expansion and contraction.

Where two separate films are used—either in the production of negatives or positives—uniformity of expansion and contraction is secured by simultaneous treatment of both films in printing, developing, washing, drying and other operations, and by uniformity in temperature of solutions, drying rooms, and other sources of expansion and contraction.

Double-width films.

Although the two films may be separate, as already stated, it is preferred to make both the negative and positive films of double width, with their corresponding section-pictures arranged side-by-side thereon. There are many advantages in such procedure, one of which is that the corresponding sections are kept together, and another is that simultaneous and similar expansion or contraction of both sections is ensured. There are also other advantages in the operations of printing and in general economy, and in prevention of errors.

The negative film is preferably retained in the double-width form permanently, but the printed positive film is longitudinally severed to form two single-width films before being cemented.

The printing processes.

The various printing processes which may be used to produce a cinematograph film according to this invention are any of those comprised in the following schedule, some of which can only be used alone, but others can be used in combination:—

Upon the same side of one film of half thickness are printed two color-section-images by any of the following different methods or processes:—

(A) Two photo-chemical prints superimposed by two sensitizings;

(B) One photo-mechanical dye-print superimposed upon one photo-chemical print;

(C) Two Woodbury or Stanotype prints, of full-tone description, superimposed;

(D) Two half-tone or broken-tone prints, of either relief, intaglio, or planographic description, superimposed;

(E) Two photo-chemical prints, of dot or line description; placed in adjacent areas, not superimposed;

(F) One group of colored grains, and the spaces between filled with dyed colloid, the grains and spaces both being sensitized;

(G) Two groups of intermixed grains, each of a different color, both being sensitized;

(K) One two-color group, formed by means of a mosaic two-color filter-screen, partially blocked out by an opaque image formed by means of a superimposed sensitized layer exposed and developed.

And upon the same side of another film of half thickness are printed two other colors, by any of the above methods, such further two-color section-images being complementary to those of the first section-images.

The development and other treatment of the films in carrying out any of these several processes is the same as described in detail in the particular division dealing with each particular process.

Assembling, cementing and completing.

Having completed the two-color section-prints, it now only remains to assemble and unite them back-to-back so that the two celluloid supports are united to form one. This is effected by moistening the back of each with a solvent of celluloid such as amyl-acetate or equivalent; then correctly assembling the sections back-to-back; then accurately registering them in the assembling machine by means of pins which exactly fit the holes of the perforations; then clamping them together under pressure until the two moistened surfaces have become indissolubly cemented together as one. This is preferably effected by a step-by-step, picture-by-picture flat-pressure movement, rather than by a continuous rotary movement, although either method can be used.

When the cement is dry and the perforations have been cleared of any exuding cement the whole of the processes are completed; the result produced is a film similar to the completed film described in U. S. Patents Nos. 1,250,713 and 1,245,822, but with the difference that it is printed with four or three colors (instead of the two colors only produced by that process) and is constructed in an entirely different way.

What I claim as my invention and desire to protect by Letters Patent is:—

A four-color cinematograph film comprising a transparent support of half standard thickness, a colloid layer carried by the support, a two-color mosaic screen filter formed in the colloid layer to give images of the portions of the picture obtaining in said two colors, a second transparent support of half standard thickness, a second colloid layer carried by the support, a second two-color mosaic screen filter formed in the colloid layer to give images of the portions of the picture obtaining in said second two colors, and a layer of cement by which the first transparent support is indissolubly united to the second transparent support whereby the two thin supports are cemented together back to back with the image layers upon the outer faces thereof.

In testimony whereof I have hereunto set my hand.

JOHN EDWARD THORNTON.